United States Patent [19]

Biles et al.

[11] Patent Number: 4,993,789
[45] Date of Patent: Feb. 19, 1991

[54] DUAL WAVELENGTH POLARIZATION SELECTIVE HOLOGRAPHIC OPTICAL ELEMENT

[75] Inventors: Jonathan R. Biles, 1422 SE. Knight St., Portland, Oreg. 97202; Ho W. Lo, Portland, Oreg.

[73] Assignee: Jonathan R. Biles, Portland, Oreg.

[21] Appl. No.: 244,923

[22] Filed: Sep. 15, 1988

[51] Int. Cl.$^5$ .................. G02B 5/32; G02B 27/28; G11B 7/12
[52] U.S. Cl. .................. 350/3.7; 369/103; 350/395
[58] Field of Search .............. 350/3.7, 3.72, 3.77, 350/401, 320, 370, 394, 395, 162.11; 369/44, 45, 103, 44.11, 44.42; 365/124, 125

[56] References Cited

U.S. PATENT DOCUMENTS

| | | | |
|---|---|---|---|
| 4,458,980 | 7/1984 | Ohki et al. | 369/103 |
| 4,497,534 | 2/1985 | Sincerbox | 350/3.72 |
| 4,654,839 | 3/1987 | Endo | 369/46 |
| 4,733,065 | 3/1988 | Hoshi et al. | 369/112 |
| 4,734,905 | 3/1988 | Kuwayama et al. | 369/112 |
| 4,776,652 | 10/1988 | Ih | 350/3.72 |
| 4,789,977 | 12/1988 | Oudenhuysen et al. | 350/3.72 |
| 4,824,191 | 4/1989 | Kato et al. | 350/3.72 |
| 4,829,506 | 5/1989 | Bressers et al. | 350/3.72 |

OTHER PUBLICATIONS

Kogelnik, "Coupled Wave Theory for Thick Hologram Gratings," *Bell System Technical Journal*, vol. 48, No. 9, Nov. 1969, pp. 2909-2947.
Kimura et al., "Compact Optical Head Using a Holographic Optical Element for CD Players", Applied Optics, vol. 27, No. 4, Feb. 15, 1988, pp. 668-671.
Lin et al., "Efficient and Aberation-Free Wavefront Reconstruction from Holograms Illuminated at Wavelengths Differing from the Forming Wavelength", *Applied Optics*, vol. 10, No. 6, Jun. 1971, pp. 1314-1318.
Winich, "Designing Efficient Aberation-Free Holographic Lenses," *Journal of the Optical Society of America*, vol. 72, No. 1, Jan. 1982, pp. 143-148.
Moran, "Compensation of Aberrations Due to Wavelength Shift in Holography", *Applied Optics*, vol. 10, No. 8, Aug. 1971, pp. 1909-1913.
Malin et al., "Wavelength Scaling Holographic Elements", *Optical Engineering*, vol. 20, No. 5, Sep./Oct. 1981, pp. 756-758.
Latta et al., "Design Techniques for Forming 477 nm Holographic Lenses with Reconstruction at 633 nm", *Applied Optics*, vol. 18, No. 14, Jul. 15, 1976, pp. 2418-2421.

Primary Examiner—Bruce Y. Arnold
Assistant Examiner—David R. Parsons
Attorney, Agent, or Firm—Fliesler, Dubb, Meyer & Lovejoy

[57] ABSTRACT

A polarization-selective holographic element having first and second holographic layers, each holographic layer including holograms comprising a plurality of fringes which are recorded with light having a first wavelength $\lambda_1$. The holographic optical element transmits a first component of light having a second wavelength $\lambda_2$ without diffraction and diffracts a second component of the light having the second wavelength by a selected angle. The holograms have a high diffraction efficiency and are recorded with beams making angles $\sigma_1$ and $\sigma_2$ with a normal to the surface of the holographic layers, where $|\theta_2-\theta_1|=|\sigma_2-\sigma_1|=2\alpha$, $\lambda_2/(\sin\theta_1+\sin\theta_2)=\lambda_1/(\sin\theta_1+\sin\theta_2)$, and $\theta_1$ and $\theta_2$ are the incident and diffracted angles of the second component of the light having the second wavelength.

32 Claims, 5 Drawing Sheets

DUAL WAVELENGTH POLARIZATION SELECTIVE HOLOGRAPHIC OPTICAL ELEMENT

CROSS-REFERENCE TO RELATED APPLICATION

The subject co-pending Application is related to the Application entitled POLARIZATION SELECTIVE HOLOGRAPHIC Sept. 15, 1988, Ser. No. 07/244,923 with the subject Application.

BACKGROUND OF THE INVENTION

1. Field of the Invention

The present invention relates to a holographic optical element; more particularly, a dual-wavelength polarization-selective holographic beam splitter useful in an optical head.

2. Description of the Related Art

Optical heads are utilized to guide radiation, e.g., light, emitted from a laser to the surface of a data storage medium and to guide the light reflected from the data storage medium to a detector. It is desirable to have the incident light traveling in a direction normal to the surface of the data storage medium, and thus the reflected beam travels the same path as the incident beam. Accordingly, it is necessary to separate the incident and reflected beams so that the reflected beam can be directed to a detector. This process of imaging light onto the surface of a recording medium and detecting the reflected light, for optically storing and retrieving data or for tracking in an optical, magnetic or magneto-optic storage system, requires a large number of expensive optical elements.

In the following discussion of conventional optical heads and existing designs of holographic beam splitters, an optical head for use, e.g., in a compact disk player, is described to facilitate the description of the related art. A first conventional optical head will be described with reference to FIG. 1. The optical head of FIG. 1 includes a laser 10 which provides a beam of incident light 12. The light emitted by laser 12 is polarized and the laser is rotated to select the direction of polarization with respect to the direction of the incident beam 12. The incident beam 12 can have either P or S polarization—in general the laser is rotated so that beam 12 is P-polarized. Polarized beam 12a passes through collimator 14 and then enters polarization beam splitter 18 which is designed to allow a first polarization-type incident beam (i.e., P-polarized beam 12a) to pass therethrough without change. The polarized incident light beam then enters a quarter-wave plate 20 which converts the P-polarized incident beam 12a to circularly polarized incident beam 12b. The circularly polarized incident beam 12b can be right or left circularly polarized depending on the orientation of the quarter-wave plate 20 and the polarization, i.e., S or P polarization, of the polarized incident beam 12a. Beam 12b is focussed on the surface of an optical storage medium, for example, a compact disk 22, by an objective 24.

Upon reflection from the surface of compact disk 22, circularly polarized incident beam 12b is converted to a reflected beam having the opposite type circular polarization, a right-hand circularly polarized beam 12b is converted to a left-hand circularly polarized beam and vice versa. Thus, circularly polarized reflected beam 12c has the opposite circular polarization type from circularly polarized incident beam 12b. Beam 12c is re-collimated by objective 24, and then converted to second polarization type reflected light 12d (i.e., S type polarization) having an opposite polarization type from first polarization-type incident light 12a. Polarization beam splitter 18 causes beam 12d to be directed towards a detector 26. A concentrating lens 28 is provided between polarization beam splitter 18 and detector 26 to focus beam 12d on the detector 26.

Conventional polarization beam splitter 18 provides a 90° re-direction of the reflected beam 12d. Accordingly, detector 26 must be placed alongside the polarization beam splitter 18 so that beam 12d is incident on detector 26. When the optical head is moved to track the beam over the surface of the storage medium 22 the space occupied by detector 26 becomes significant. Further, concentrating lens 28 must be carefully aligned with polarization beam splitter 18 (or the optical path or redirected beam 12d) and detector 26 must be aligned with the optical path to allow detector 26 to focus and track beam 12b on disk 22, and to read data on disk 22. This alignment must be accurate to within tens of microns. In addition, concentrating lens 28 is an expensive element, due in part to the need for astigmatic power to provide proper focusing.

A second conventional optical head, manufactured by Pencom International Corporation, employs a hologram as a beam splitter. The intensity of light provided to the detector after reflection from a nearly 100% reflector using the Pencom design has been reported to be less than 10% of the light emitted by the laser. This extreme drop in intensity places severe demands on the amplifying circuitry used to control the focusing and tracking servos and requires an optical medium with high reflectivity. Moreover, the Pencom design allows a significant amount of reflected light to enter the optical cavity, which may result in instability of the laser. The Pencom holographic optical head will be described with reference to FIGS. 2A–B.

In the Pencom holographic optical head, laser 10 provides an incident light beam 30 which passes through collimator 14 and then into a holographic optical element 32. Holographic optical element 32 is not polarization-selective, and a portion of all incident light 30a, regardless of polarization, is diffracted. Approximately 10% of the incident beam 30a is diffracted into each of the plus and minus first order diffractions, and some, approximately 1–5%, of the incident beam 30a is diffracted into each of the plus and minus second and higher order diffractions. Smaller percentages of the incident beam 30a are diffracted into higher order diffractions. As a result, holographic beam splitter 32 has a forward efficiency of approximately 70%. Only the undiffracted incident beam 30b is focused on optical storage medium 22 by objective 24.

A reflected beam 30c is re-collimated by objective 24. When reflected beam 30c enters holographic beam splitter 32 the reflected beam 30c is again diffracted by holographic beam splitter 32. In the Pencom design, detector 26 is placed so that it receives diffracted reflected beam 30d, comprising the portion of the reflected beam 30c which is diffracted into the plus or minus first order after beam 30d again passes through collimator 14. Collimator 14 takes the place of concentrating lens 28 in the conventional design of FIG. 1.

The holographic optical element 32 of the Pencom optical head is shown in FIG. 2B. First and second substrates 34a, b are provided on each side of a holographic layer 36. Holographic layer 36 has a plurality of fringes 38 having a spacing d. In the holographic optical element 32 used in the Pencom optical head, the spacing d of fringes 38 is relatively large, on the order of 4 μm.

The downfall in the Pencom design is that only 10% of the reflected beam 30b is diffracted into the first order. Thus, the diffracted reflected beam 30d has an intensity of only 10% of reflected beam 30c. Assuming 100% efficiency of each of the elements and 100% reflection from the surface of the storage medium 22, the intensity of diffracted reflected beam 30c is only 7% of the intensity of the incident beam 30a, i.e., 10% of the 70% of the incident beam which is not diffracted by holographic optical element 32.

In addition, since the holographic optical element 32 utilized in the Pencom design is not polarization selective, the undiffracted reflected beam 30e passes back into the optical cavity of laser 10 which may cause instability of the laser. Moreover, with the holographic beam splitter 32 utilized by Pencom, it is not possible to remove the high order diffracted beams, i.e., diffracted beams above the first order.

NEC Corporation has constructed a holographic optical element to be used in a third conventional optical head, as described in "Compact Optical Head Using A Holographic Optical Element For CD Players," Kimira et al., Applied Optics, Vol. 27, No. 4, pp. 668–671. In the NEC design, multiple holograms containing tracking and focusing information used to track and focus the reflected beam on the detector array used for sensing the data are stored in the hologram of the holographic optical element. The surface relief holograms employed in the NEC design are not polarization selective.

Another holographic optical head is disclosed in U.S. Pat. No. 4,497,534 to Sincerbox. The Sincerbox holographic optical head, however, requires all of the optical elements in the head to be maintained in an environment having essentially the same index of refraction as the materials forming the optical elements to prevent total internal reflection of the diffracted beams within the holograms.

The polarization selectivity of holograms was discussed in the Appendix of "Coupled Wave Theory For Thick Hologram Gratings," H. Kogelnik, Bell System Technical Journal, Vol. 48, No. 9, November 1969, p. 2909. One phenomenon noted by Kogelnik is that holograms which diffract light perpendicularly, so that the diffracted light travels in a direction perpendicular to the direction of the incident light, exhibit the greatest polarization selectivity.

It is known that a hologram will diffract the "S" polarized portion of incident light by 90° while allowing the "P" portion of the polarized light to pass without diffraction. However, as known to those of ordinary skill in the art, the "S" polarized light cannot escape from the holographic material or the substrate on which the holographic material is supported since the light will be totally internally reflected, regardless of the angle that the incident beam makes with the surface of the hologram, after the light is diffracted by 90°. Thus, although it has been possible to create a hologram which selects one type of polarized light, it has been necessary to either use a prism to extract the diffracted light from the hologram or the supporting substrate or place the hologram in an environment having an index of refraction essentially the same as that of the hologram One method of providing an environment having essentially the same index of refraction as the hologram, utilized by Sincerbox, is to have the substrate on which the hologram is supported (plural elements laminated with optical adhesive) extend between all of the elements in the optical head.

Optical heads used in, for example, compact disk players, operate in conjunction with a diode laser. However, there are no known holographic recording materials which can be utilized to record holograms having a large diffraction efficiency (i.e., near 100%) when the wavelength of the light used to record (or create) the hologram is in the infrared range—diode lasers emit light in the infrared range. Accordingly, it has been difficult to create holograms, and thus holographic optical elements, for use with diode lasers.

In order to create holograms which reconstruct infrared light with high efficiency, a multi-step process has been used to record the holograms. One such process is disclosed in "Efficient and Aberration-Free Wavefront Reconstruction From Holograms Illuminated At Wavelengths Differing From The Former Wavelength," L. H. Lin, et al., Applied Optics, Vol. 10, No. 6, June 1971, pg. 1314–1318. This multi-step method involves recording a first hologram at the infrared wavelength, illuminating the first hologram using blue light, and using the blue light diffracted by the first hologram to create a second high-efficiency hologram useful with infrared light.

SUMMARY OF THE INVENTION

It is therefore, an object of the present invention to provide a holographic optical element which is polarization-selective and have a hologram recorded with light having a different wavelength than the light used to reconstruct the hologram.

A further object of the present invention is to provide a polarization-selective holographic beam splitter which operates at two selected wavelengths.

Another object of the present invention is to provide a polarization-selective holographic beam splitter having holograms recorded at a first wavelength which diffracts only the second component of polarized light, namely S-polarized light, having the first or the second wavelength and which transmits the first component of polarized light, namely P-polarized light, having the first or the second wavelengths undiffracted.

Another object of the present invention is to record the holograms utilized in a polarization holographic beam splitter with light having a first wavelength and to reconstruct the holograms with light having a second wavelength.

Another object of the present invention is to provide a polarization-selective holographic beam splitter for use with a diode laser.

Another object of the present invention is to provide a dual wavelength polarization-selective holographic beam splitter having optical power, for use in an optical head, by storing holograms for cylindrical and other powers and for auto-focusing and tracking capabilities.

A holographic optical element in accordance with the present invention includes first holographic means containing a hologram comprising a plurality of fringes recorded with light of a first wavelength $\lambda_1$ and having a tilt angle $\alpha_1$ with respect to a normal to said first holographic means, for transmitting a first polarized light component of light without diffraction and diffracting, by a selected angle, a second polarized light component having a second wavelength $\lambda_2$ and making an incident angle $\theta_1$ with a normal to said first holographic means, the diffracted second polarized light component making a diffracted angle $\theta_2$ with a normal to said first holographic means, said hologram in said first holographic means being recorded with two beams making respective angles $\sigma_1$ and $\sigma_2$ with a normal to said first holographic means, where $2\alpha_1 = |\theta_2 - \theta_1| = |\sigma_2 - \sigma_1|$ and $\lambda_2/(\sin\theta_1 + \sin\theta_2) = \lambda_1/(\sin\sigma_1 + \sin\sigma_2)$, and second holographic means containing a hologram comprising a plurality of fringes recorded with light of a first wavelength $\lambda_1$ and having a tilt angle $\lambda_2$ with a normal to said second holographic means, for transmitting the first polarized light component without diffraction and diffracting the second polarized light component diffracted by said first holographic means and making an incident angle $\theta_3$ with a normal to said second holographic means by a selected angle, said hologram in said second holographic means being recorded with two beams making respective angles $\sigma_3$ and $\sigma_4$ with a normal to said second holographic means, where $2\alpha_2 = |\theta_4 - \theta_3| = |\sigma_4 - \sigma_3|$ and $\lambda_2/(\sin\theta_3 + \sin\theta_4) = \lambda_1/(\sin\sigma_3 + \sin\sigma_4)$.

An optical head in accordance with the present invention for interacting with an optical storage medium by directing an incident light beam at the optical storage medium and detecting a reflected light beam, includes source means for providing an incident light beam, the incident light beam being polarized in the P direction and having a first wavelength, a quarter-wave plate for converting the P-polarized incident light beam to a first type circularly polarized light beam and for converting a second type circularly polarized reflected light beam to a reflected light beam polarized in the S direction, and polarization-dependent holographic beam splitter means comprising the above-described holographic optical element.

DESCRIPTION OF THE PREFERRED EMBODIMENTS

A polarization selective holographic beam splitter and its use as a holographic optical element in an optical head will be described with reference to FIGS. 3–5. The recording of high diffraction efficiency holograms for use with a holographic beam splitter with light of a first wavelength so that the holograms can be reconstructed with light of a second wavelength will be described with reference to FIG. 6. As stated above, the optical head will be described as utilized in a compact disk player; however, an optical head in accordance with the present invention may be utilized to interact with any type of optical storage medium, for example, so-called laser disks for storing audio and video information optically, and magneto-optic disks for storing data for use in computer systems. In addition, the holographic beam splitter of the present invention has many uses and is not limited in its application to a holographic optical element in an optical head. Examples of other applications of a holographic beam splitter include laser scanners, such as bar code readers, and laser surveying equipment.

Figure 1:
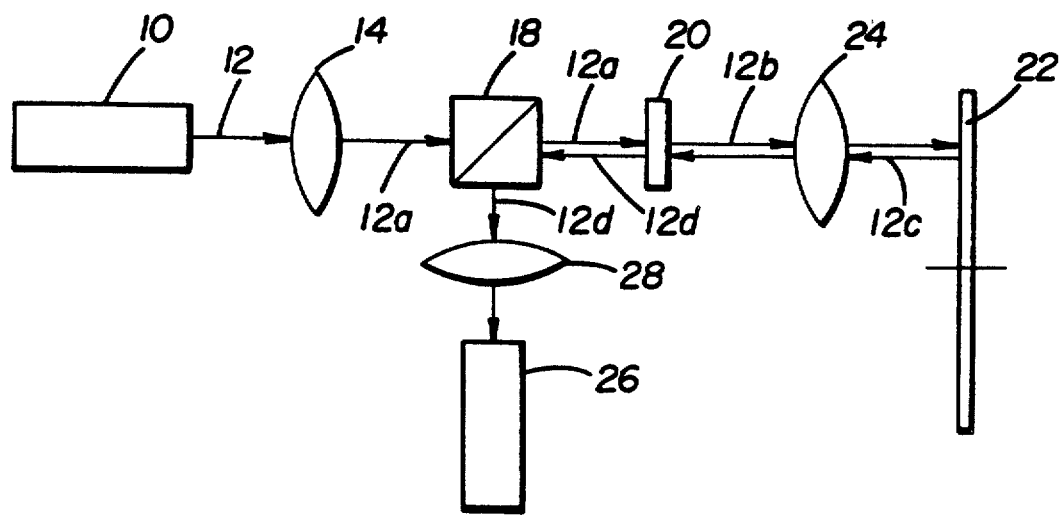
FIG. 1 is a block diagram of a first conventional optical head.
Figure 2A:
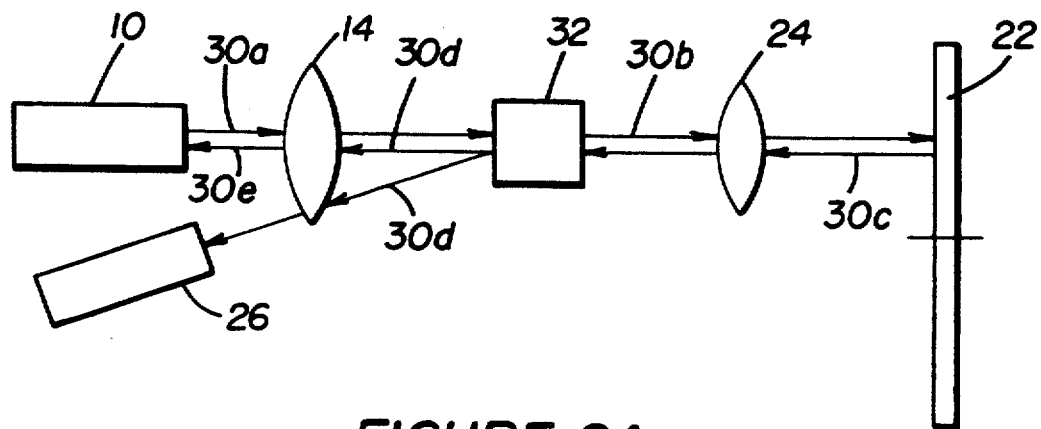
FIG. 2A is a block diagram of a second conventional optical head.
Figure 2B:
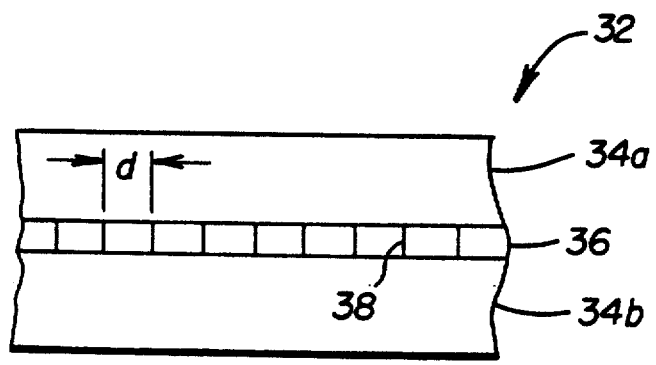
FIG. 2B is a cross-sectional view of a holographic optical element used in the second conventional optical head.
Figure 3:
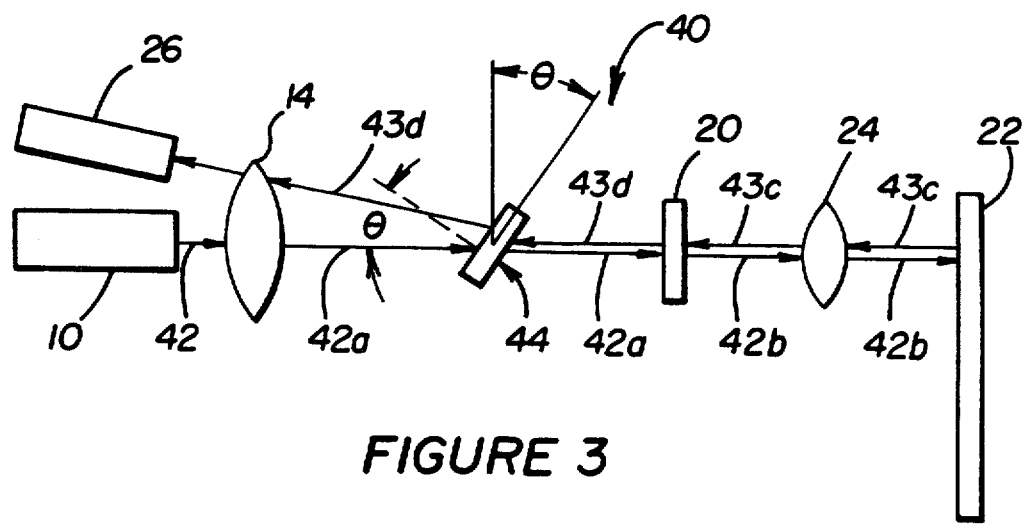
FIG. 3 is a block diagram of an optical head in accordance with the present invention.

An optical head 40 in accordance with the present invention in shown in FIG. 3. In operation, a laser 10 emits a beam of polarized incident light 42a which is collimated by collimator 14. The laser 10 is oriented so that the polarized incident beam 42a comprises P-type polarized light. The P-type polarized incident light 42a passes through holographic optical element 44 without being acted upon (the operation of holographic optical element 44 is discussed below). Quarter-wave plate 20 converts the P-type polarized incident light 42a to circularly polarized incident light 42b having a first type circular polarization. The circularly polarized incident light 42b is focussed on disk 22 by objective 24.

A circularly polarized reflected beam 43c has a second type circular polarization, i.e., if incident beam 42b is right-hand circularly polarized, reflected beam 43c is left-hand circularly polarized, and vice versa. The reflected beam 43c is re-collimated by objective 24 and then converted to an S-type polarized reflected beam 43d by quarter-wave plate 20. The polarization seletivity of holographic optical element 44 causes the S-polarized reflected beam 43d to be diffracted, whereas the P-polarized incident beam 42a was not diffracted, with the result that the S-polarized reflected beam 43d emerging from holographic optical element 44 makes an angle with the incident beam 42. Reflected beam 43d passes through collimator 14 and then to detector 26. The angular displacement of the S-polarized reflected beam 43d with respect to incident beam 42 allows detector 26 to be provided alongside laser 10. In the environment of a compact disk player, laser 10 may be a diode laser, and the diode laser and detector 26 may be provided on a single substrate.

Figure 4A:
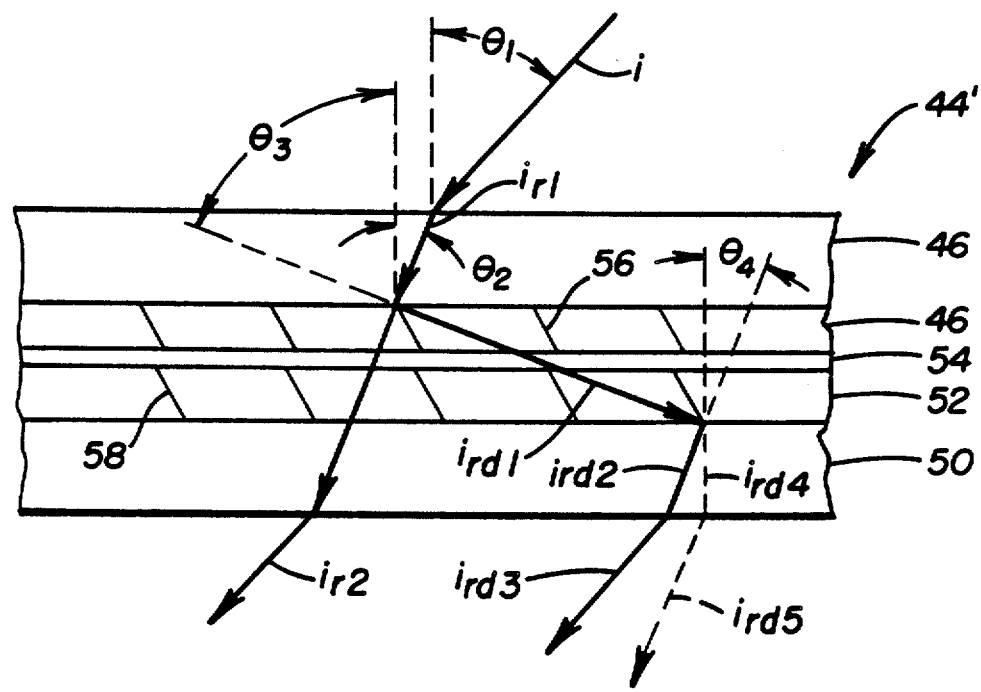
FIGS. 4A and 4B are cross-sectional views of polarization-selective holographic beam splitters in accordance with the present invention for illustrating the beam splitting capability thereof.

A first polarization selective holographic beam splitter (or holographic optical element) 44 in accordance with the present invention is shown in FIG. 4A, and the operation of the holographic beam splitter 44 as holographic optical element 44 in optical head 40 will be described with reference to FIG. 5. Holographic optical element 44 comprises a first substrate 46 having a first holographic layer 48 provided on one surface thereof. A second substrate 50 has a second holographic layer 52 on one of its surfaces, and an adhesive layer 54 bonds first and second holographic layers 48 and 52.

First and second substrates 46, 50 may be standard glass plates and holographic layers 48, 52 may be formed of, for example, dichromated gelatin which could be provided on respective substrates 46, 50 by doctor blading or spin coating. Substrates 46, 50 may comprise other transparent materials, for example, plastic, and alternative materials for holographic layers 48, 52 include silver halide and photopolymeric materials.

The adhesive 54 may be, for example, Norland 60 transparent adhesive.

Prior to joining holographic layers 48, 52 with adhesive 54, holograms in the form of a diffraction grating are recorded in each of the holographic layers 48, 52. These diffraction gratings comprise a series of fringes 56, 58 having a different index of refraction than the other portions of the holographic layers 48, 52.

When an incident light beam i having P-polarized and S-polarized components passes through holographic optical element 44, the P and S-polarized components of the incident beam are separated in the following manner. The incident beam i is refracted upon entering first substrate 46. The refracted incident beam $i_{r1}$ then passes into first holographic layer 48. The P-polarized component of refracted incident beam $i_{r1}$ is unaffected by either first or second holographic layers 48, 52, and thus travels through first holographic layer 48, adhesive 54, and second holographic layer 52 without diffraction. Upon reaching the substrate/air interface when exiting second substrate 50, the P-polarized light $i_{r1}$ is refracted into an exiting beam $i_{r2}$ parallel with incident beam i.

On the other hand, the S-polarized component of beam $i_{r1}$ is diffracted by an angle determined by the orientation and spacing of fringes 56 upon passing through first holographic layer 48, yielding beam $i_{rd1}$. The angle of diffraction for the hologram in first holographic layer 48 may be selected to be 90° to take advantage of the high polarization selectivity provided by a 90° diffraction. The beam $i_{rd1}$ would be totally internally reflected at the interface of any two media having different indices of refraction, for example, at a first holographic layer 48/air interface, or at a substrate/air interface if a substrate is provided on the opposite side of first holographic layer 48 from the first substrate 46. In order to prevent the total internal reflection of beam $i_{rd1}$, second holographic layer 52 diffracts beam $i_{rd1}$ a second time to yield diffracted beam $i_{rd2}$. Beam $i_{rd2}$ travels at an angle such that beam $i_{rd2}$ will be refracted, not totally internally reflected, at the air/second substrate 50 interface. The S-polarized exiting beam $i_{rd3}$ will be spatially separated from the exiting P-polarized beam $i_{r2}$.

If the second holographic layer 52 diffracts beam $i_{rd1}$ by 90°, exiting beams $i_{r2}$ and $i_{rd3}$ will be parallel. Alternatively, the angle of fringes 58 in second holographic layer 52 may be selected so that beam $i_{rd1}$ is diffracted by more or less than 90°. The dashed-line example in FIG. 4A shows the result if beam $i_{rd4}$ is diffracted by less than 90° with respect to beam $i_{rd1}$, in which case beams $i_{r2}$ and $i_{rd5}$ will be spatially separated and will be traveling in different directions. The spatial separation achieved with optical element 44 may not be large, and thus the angular difference in the direction of exiting beams $i_{r2}$ and $i_{rd5}$ may be the more useful method of separating the P and S polarized components of incident beam i.

The drawings treat the light beams as lines and show the diffraction of the beams occurring at one fringe in each holographic layer 48, 52. In practice, the light has a diameter and the light behaves as a wave, as opposed to a particle, and thus the diffraction of a beam occurs throughout the thickness of a holographic layer.

As discussed with respect to FIG. 3 in optical head 40 P-polarized light travels through holographic optical element 44 in one direction and S-polarized light travels through holographic optical element 44 in the other direction. The operation of holographic optical element 44 in this situation will be described with reference to FIG. 5. The angles $\alpha_1$ and $\alpha_2$ of respective fringes 56, 58 in holographic layers 48, 52 depend on the angle of diffraction which is desired and upon the angle at which the incident light enters the holographic layer. (The calculation of the fringe angle is discussed below.) In one embodiment of the present invention the polarized incident beam 42a is incident on holographic optical element 44 at Brewster's angle, shown as $\theta_1$. This angle of incidence is accomplished by rotating holographic optical element 44 by the same angle $\theta_1$ (FIG. 3).

The P-polarized incident light 42a is refracted at the air/first substrate 46 interface, and then travels through first substrate 46, first holographic layer 48, adhesive layer 54, second holographic layer 52, and second substrate 50 before being refracted again at the second substrate 50/air interface. S-polarized reflected beam 42d, which is traveling in the opposite direction than P-polarized incident beam 42a and also enters holographic optical element at Brewster's angle, is refracted at the air/second substrate 50 interface to beam $42d_r$. Beam $42d_r$ makes an incident angle $\theta_2$ with second holographic layer 52 and is diffracted by 90° by second holographic layer 52, resulting in beam $42d_{rd1}$. Beam $42d_{rd1}$ makes a diffracted angle $\theta_3$, travels through adhesive 54, and is incident on first holographic layer 48 at angle $\theta_3$—in the case where first and second holographic layers 48, 52 are parallel the diffracted angle for one holographic layer is the incident angle for the other holographic layer. Beam $42d_{rd1}$ is then diffracted by first holographic layer 48, resulting in beam $42d_{rd2}$. The angle $\alpha_1$ of fringes 56 in first holographic layer 48 is selected so that the angle 7 by which beam $42d_{rd1}$ is diffracted is less than 90°, so that beam $42d_{rd2}$ when refracted at the first substrate 46/air interface exits the holographic optical element 44 as beam $42d_{rd3}$ which is not parallel with beam 42a. Thus, $\theta_2 \neq \theta_4$. (It is noted that the incident and diffracted angles $\theta_1 - \theta_4$ are all measured as positive angles with normals to the respective substrates and holographic layers.)

The spacing $d_1$ of fringes 56 in first holographic layer 48 and the spacing $d_2$ of fringes 58 in second holographic layer 52 is established in accordance With the following equation:

$$d = \lambda / 2n \sin\psi \qquad (1)$$

where $\lambda$ is the wavelength of the light emitted by laser 10, n is the index of refraction of the holographic layer (not fringes 56, 58), and $\psi$ represents the angle of incidence and reflection (which are equal) between the beam and the normal to fringes 56, 58.

The thicknesses $t_1$ and $t_2$ of first and second holographic layers 48, 52 and the change in the index of refraction between the holographic layers 48, 52 and the fringes 56, 58 are selected using known parameters to provide substantially 100% diffraction efficiency for S-polarized light, as disclosed by Kogelnik.

Figure 4B:
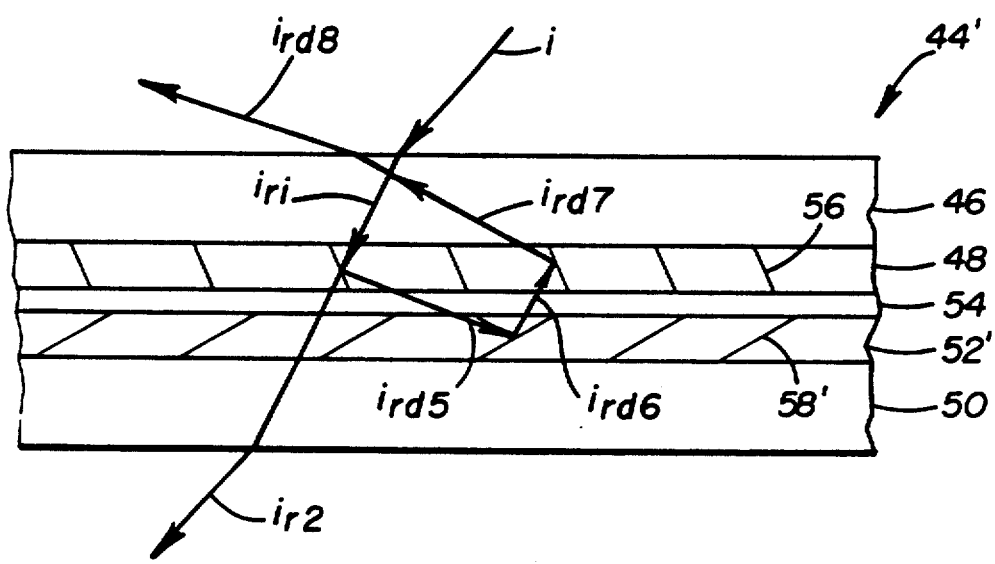

An alternative beam splitter 44' in accordance with the present invention will be described with reference to FIG. 4B. In operation of beam splitter 44' an incident beam i is refracted at the air/first substrate 46 interface, and the P-polarized component of refracted beam $1_{r1}$ passes through first holographic layer 48, adhesive layer 54, second holographic layer 52', and second substrate 50 without diffraction, and is refracted at the second substrate 50/air interface to yield exiting beam $i_{r2}$. The S-polarized component of beam $i_{r1}$ is diffracted by fringes 56 in first holographic layer 48. The diffracted beam $i_{rd1}$ passes through adhesive layer 54 and then is diffracted by fringes 58' in second holographic layer 52' back through adhesive layer 54 and into first holographic layer 48 as beam $i_{rd6}$. Beam $i_{rd6}$ is again refracted by first holographic layer 48 to provide beam $i_{rd7}$ which is again refracted at the first substrate 46/air interface to yield exiting beam $i_{rd8}$. Exiting beam $i_{rd8}$ travels in a different direction than incident beam i, and thus the S-polarized component of incident beam i can be separated into the P-polarized component of beam $i_{r2}$ and the S-polarized component of beam $i_{rd8}$.

In order to prevent the S-polarized portion of the beam from being totally internally reflected, the fringe angle $\alpha_2$ of fringes 58' in second holographic layer 52 is selected to be large enough so that beam $i_{rd7}$ is not totally internally reflected at the first substrate 46/air interface.

To achieve maximum efficiency when reconstructing the holographic image, the Bragg condition must be satisfied. The Bragg condition for waves diffracted from fringes spaced a distance d apart is expressed by equation (1). If the diffracted beam is perpendicular to the incident beam, then $\psi = 45°$. Using an index of refraction $n = 1.51$ for substrates 46, 50, holographic layers 48, 52, and adhesive 54 (assuming similar indices of refraction) and $\lambda = 0.8$ $\mu$m (the wavelength of a diode laser), the fringe spacing d is 0.374 $\mu$m. For a beam entering the substrate at Brewster's angle, the entrance angle $\theta_1$ is:

$$\arctan n = 56.5°. \tag{2}$$

Using Snell's Law the angle $\theta_2$ of the beam after refraction at the air/first substrate 46 interface is 33.8°. $\theta_2$ defines the direction in which the beam is traveling with respect to the normal to the holographic layer when incident upon fringes 56. The tilt angle $\alpha_1$ is $\frac{1}{2}(\theta_3 - \theta_2)$, where $\theta_3$ is the angle between the diffracted beam and the normal to the holographic layer. For a 90° diffraction $\alpha_1 = 11.5°$.

Figure 5:
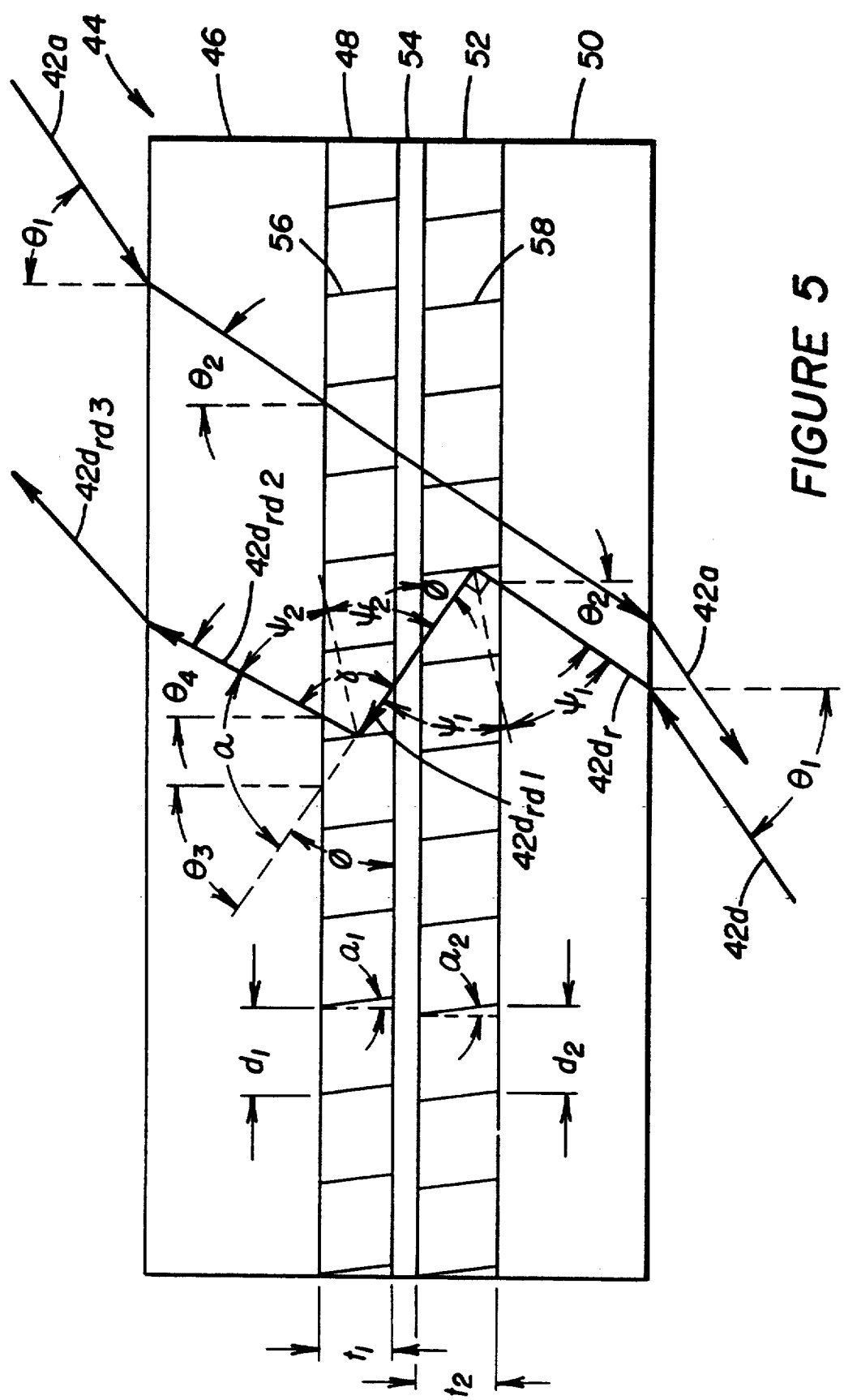
FIG. 5 is a cross-sectional view of a holographic polarization-selective beam splitter in accordance with the present invention for describing its use in an optical head.

In the holographic optical element shown in FIG. 5 the tilt angle $\alpha_1$ of the fringes 56 is slightly greater than the tilt angle $\alpha_2$ of fringes 58 so that the angle of diffraction $\gamma$ provided by first holographic layer 48 is slightly less than 90°. If $\alpha_1 = \alpha_2$, the fringes 56, 58 in respective holographic layer 48, 52 are aligned so that the parallel planes of the fringes 56 in holographic layer 48 are substantially parallel to the parallel planes of the fringes 58 in holographic layer 52. If different angles of diffraction for the two holographic layers 56, 58 are desired, a small difference in $\alpha_1$ and $\alpha_2$ creates an angle between the parallel planes of the fringes 56, 58 in the respective first and second holographic layers 48, 52. The range of angles between the parallel planes of the fringes 56, 58 depends on the indices of refraction of the various elements, the thickness of the holographic layers 46 50, and the wavelength of the light, and is generally less than 45°.

For purposes of focussing the light on the disk 22, it is convenient to add optical power to the holograms in the holographic optical element 44. The optical power is usually astigmatic; however, optical power is to be considered as the production of any deviation from collimation. Astigmatic optical power produces different spherical diverging or converging in two perpendicular directions.

In order to record a hologram utilizing light having a first wavelength so that the hologram can be reconstructed at a second wavelength with a high diffraction efficiency, the inventors have developed an apparatus and a method which will be described with reference to FIG. 6. In particular, since diode lasers are contemplated as the light source for reconstructing the holograms in the environment of a compact disk player, and thus the wavelength for reconstruction would be $\lambda = 0.8$ $\mu$m—a wavelength which cannot be used to record high diffraction efficiency holograms.

Figure 6:
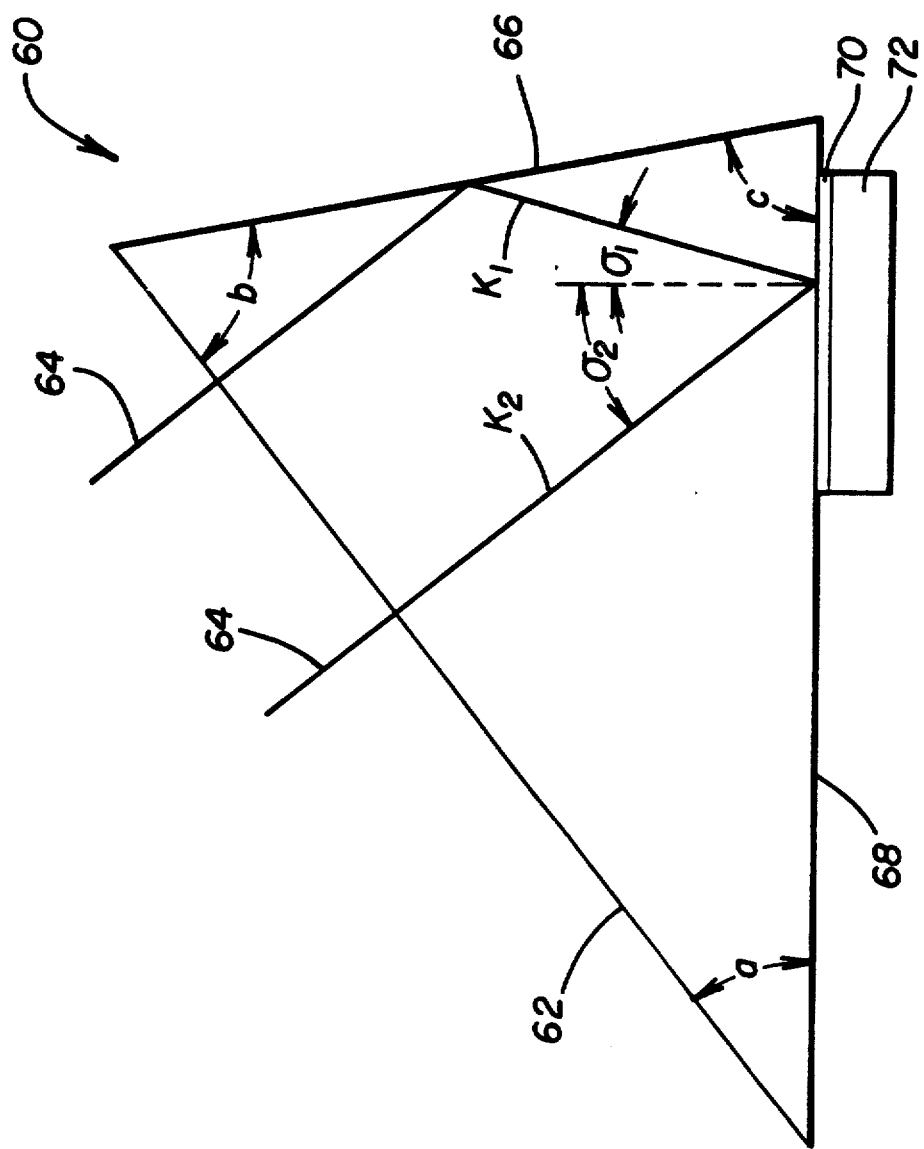
FIG. 6 is a cross-sectional view of a prism used for recording the holograms used in a holographic polarization-selective beam splitter in accordance With the present invention.

FIG. 6 illustrates the recording of holograms in a holographic layer 70 provided on a substrate 72 utilizing a prism 60 having angles a, b, and o. The hypotenuse 62 of prism 60 was oriented to face incident light 64. The portion of incident light 64 which is totally internally reflected by the smallest side 66 of prism 60 interferes with the incident light 64 which does not strike side 66. The resulting interference pattern is used to create the hologram in holographic layer 70. The recording process requires index matching holographic layer 70 against side 68 of prism 60 near the intersection of side 68 and the smallest side 66.

$\vec{K}_1$ and $\vec{K}_2$ are the wave vectors of the construction beams, where $\vec{K}_1$ is the portion of the beam totally internally reflected by side 66 of prism 60 and $\vec{K}_2$ is the beam transmitted directly through prism 60. The vector sum of wave vectors $\vec{K}_1$ and $\vec{K}_2$ is equal to $\vec{K}_0$:

$$\vec{K}_0 = \vec{K}_1 + \vec{K}_2; \text{ and} \tag{3}$$

$$|\vec{K}_1| = |\vec{K}_2| \tag{4}$$

Beam $\vec{K}_0$ (not shown) is required to make an angle $\alpha$ (the tilt angle of the fringes) with respect to a normal to the surface of holographic layer 70. The angle $\alpha$ is:

$$\alpha = \tfrac{1}{2}(\sigma_2 - \sigma_1) \tag{5}$$

where $\sigma_1$ is the angle which wave $\vec{K}_1$ makes with the normal to the surface of holographic layer 70 and $\sigma_2$ is the angle which wave $\vec{K}_2$ makes with the normal to the surface of holographic layer 48. For incident angle $\theta_2$ and diffracted angle $\theta_3$ at reconstruction, and angles $\sigma_1$ and $\sigma_2$ at recording:

$$|\sigma_2 - \sigma_1| = |\theta_3 - \theta_2|. \tag{6}$$

The vector representation of $\vec{K}_0$ is as follows:

$$\vec{K}_0 = [2\pi/\lambda_1][(-\sin\sigma_1 + \sin\sigma_2)\vec{X} + (\cos\sigma_1 + \cos\sigma_2)\vec{Y}], \tag{7}$$

where $\vec{X}$ is a unit vector perpendicular to the normal to the surface of holographic layer 70 pointing to the left in FIG. 6, $\vec{Y}$ is a unit vector parallel to the normal to the surface of holographic layer 70 pointing down in FIG. 6, $\lambda_1$ is the wavelength of the light used to record the hologram, and the Bragg condition (equation (1)) is satisfied for $\lambda_1$ and the wavelength $\lambda_2$ of the light used to reconstruct the hologram. The Bragg condition requires that $$d = \lambda_1/(2n\sin\psi) \tag{8}$$

and that $$d = \pi_2/[2n(\sin\theta_2 + \sin\theta_3)]. \tag{9}$$

Equations (5), (7) and (8) can be solved for $\theta_2$ and $\theta_3$, which can be used in equation (6) to calculate the angles for prisms useful in recording holograms (or fringes) with light of wavelength $\lambda_1$ which can be reconstructed at $\lambda_2$. For example, if $\lambda_1$ 0.5145 μm (514.5 nm) and $\lambda_2$ =0.8 μm (800 nm), angles of prism 60 are as follows: angle a is 39.0 degrees; angle b is 62.55 degrees; and angle c is 78.45 degrees.

The derivation of equations (5)-(9) assumes that there is no change in the thickness of the holographic layer during development of the holograms. It is possible to use development recipes which produce little or no change in the thickness of the holographic layer; however, such recipes require close monitoring.

To account for changes in the thickness of the holographic layer during development, it is necessary to consider a change in the tilt angle α caused by swelling or shrinkage of the holographic layer during development. The final tilt angle α' after development is related to the tilt angle during exposure α by a shrinkage factor s, where:

$$s = \alpha'/\alpha. \qquad (10)$$

When the shrinkage factor is taken in account, equation (6) is modified as follows:

$$|\sigma_2 - \sigma_1| = |(\sigma_3 - \sigma_2)/s| \qquad (6')$$

combining equations (5) and (6') yields the following relationship:

$$2\alpha = |\sigma_2 - \sigma_1| = |\theta_3 - \theta_2)/s|. \qquad (11)$$

The following experiments were conducted by the inventors. Dichromated gelatin layers were coated on each of two glass plates. Holograms (fringes) were recorded using an argon laser having a wavelength of 0.5145 μm (514.5 nm) and a prism 60 having the angles a=39°, b=62.55° and c=78.45°. The holographic layers were developed using standard process for this type of holographic layer. Norland 60 transparent adhesive was used to bond the two holographic layers together to achieve the orientation shown in FIGS. 4A and 5.

This orientation was achieved by laying two holograms next to each other so that the fringes in each hologram have the same orientation (except that the tilt angles may be different) with respect to an x, y, z coordinate system. One hologram is then "flipped" onto the other so that the parallel planes of the fringes in the first hologram and the second hologram are substantially parallel or make a small angle (less than 45°) with respect to each other. This orientation process is called flipping.

The holographic optical element created with these holograms displayed a new image not present in the individual holograms, a monochromatic, angle sensitive image of a source when viewed through the holographic optical element.

The holographic optical element was mounted in front of a collimated laser light source provided by a He-Ne laser having a wavelength of 633 nm (0.633 μm). The holographic optical element was placed in a mount so that the light was projected into the element at Brewster's angle. Vertically polarized light, namely S-polarized light, emitted from the laser was diffracted into only one beam by the holographic optical element. The zero and first order diffracted beam spots were the only spots present, showing that no higher order diffractions occurred. A half-wave plate was then inserted between the laser and the holographic optical element so that the polarization was horizontal, namely P-polarized light. When the P-polarized light was incident on holographic optical element the only beam spot observed corresponded to undiffracted P-polarized light.

The intensity of the zero and first order diffracted beams of P and S-polarized light using a He-Ne laser as the light source was measured. For the P-polarized light an intensity of less than 1 μwatt was measured for the diffracted beam and an intensity of 1500 μwatts was measured for the undiffracted beam. For the S-polarized light an intensity of 250 μwatts was measured for the diffracted beam and an intensity of 1200 μwatt was measured for the undiffracted beam. These intensity values demonstrate the polarization selectivity, the diffraction into a single beam for S-polarized light, and the transmission without diffraction of the P-polarized light. The experiments were conducted using holograms which did not have a 100% diffraction efficiency; however, with 100% diffraction efficiency it is contemplated that the entire S-polarized beam would be diffracted.

The many features and advantages of the dual-wavelength polarization selective holographic beam splitter of the present invention will be apparent to those of ordinary skill in the art from the specification. Accordingly, the following claims are intended to cover all modifications and equivalents falling within the scope of the invention.

What is claimed is:

1. A holographic optical element, comprising:
   first holographic means, containing a hologram comprising a plurality of fringes recorded with light of a first wavelength $\lambda_1$ and having a tilt angle $\alpha_1$ with respect to a normal to said first holographic means, for transmitting a first polarized light component of light without diffraction and diffracting, by a selected angle, a second polarized light component having a second wavelength $\sigma_2$ and making an incident angle $\theta_1$ with a normal to said first holographic means, the diffracted second polarized light component making a diffracted angle $\theta_2$ with a normal to said first holographic means, said hologram in said first holographic means being recorded with two beams making respective angles $\sigma_1$ and $\sigma_2$ with a normal to said first holographic means, where $2\alpha_1 = |\theta_2 - \theta_1| = |\sigma_2 - \sigma_1|$ and $\lambda_2/(\sin\theta_1 + \sin\theta_2) = \lambda_1/(\sin\sigma_1 + \sin\sigma_2)$; and
   second holographic means, containing a hologram comprising a plurality of fringes recorded with light of a first wavelength $\lambda_1$ and having a tilt angle $\alpha_2$ with a normal to said second holographic means, for transmitting the first polarized light component without diffraction and diffracting the second polarized light component diffracted by said first holographic means and making an incident angle $\theta_3$ with a normal to said second holographic means by a selected angle, said hologram in said second holographic means being recorded with two beams making respective angles $\sigma_3$ and $\sigma_4$ with a normal to said second holographic means, where $2\alpha_2 = |\theta_4 - \theta_3| = |\sigma_4 - \sigma_3|$ and $\lambda_2/(\sin\theta_3 + \sin\theta_4) = \lambda_1/(\sin\sigma_3 + \sin\sigma_4)$.

2. A holographic optical element according to claim 1, wherein said first and second holographic means diffract the second polarized light component into a single beam.

3. A holographic optical element according to claim 1, wherein said fringes in said first holographic means lie in a first group of parallel planes, said fringes in said second holographic means lie in a second group of parallel planes, and said first and second groups of parallel planes intersect at an angle less than approximately forty-five degrees.

4. A holographic optical element according to claim 3, wherein:
said first holographic means diffracts the S-polarized light component into said second holographic means; and
said second holographic means diffracts the S-polarized light diffracted by said first holographic means so that the S and P components of the incident light make an angle of greater than zero degrees with respect to each other upon exiting said second holographic means.

5. A holographic optical element according to claim 1, wherein the first and second components of the incident light are P and S-polarized light, respectively.

6. A holographic optical element according to claim 1, wherein $\theta_2 = \theta_3$.

7. An optical head for interacting with an optical storage medium by directing a light beam at the optical storage medium and detecting the light beam reflected by the optical storage medium, comprising:
source means for providing the light beam having a first wavelength $\lambda_1$ and a polarization in the P direction;
converting means for converting the P-polarized light beam to a first type circularly polarized light beam and for converting a second type circularly polarized reflected light beam to an S-polarized reflected light beam; and
a holographic optical element, comprising:
first and second transparent substrates, and
first and second holographic layers provided between said transparent substrates, each said holographic layer containing a hologram comprising a plurality of fringes recorded at a second wavelength $\lambda_2$ and having a tilt angle $\alpha$ with a normal to said holographic layer, each said holographic layer transmitting a first polarized light component of light having the first wavelength $\lambda_1$ and making an incident angle $\theta_1$ with a normal to said respective holographic layer without diffraction, said first holographic layer diffracting a second polarized light component of light having the first wavelength by a selected angle so that the second polarized light component diffracted by said first holographic layer makes a diffracted angle $\theta_2$ with a normal to said first holographic layer, said second holographic layer diffracting, by a selected angle, the second polarized light component diffracted by said first holographic layer and making an incident angle $\theta_1$ with a normal to said second holographic layer so that the second polarized light component makes a diffracted angle $\theta_2$ with a normal to said second holographic layer, each said hologram being recorded with two beams making respective angles $\sigma_1$ and $\sigma_2$ with a normal to said holographic layer, where $2\alpha = |\theta_2 - \theta_1| = |\sigma_2 - \sigma_1|$ and $\lambda_1/(\sin\theta_1 + \sin\theta_2) = \lambda_2/(\sin\sigma_2 + \sin\theta_2)$.

8. An optical head according to claim 7, wherein the first and second components of the incident light are P and S-polarized light, respectively.

9. An optical head according to claim 8, wherein:
said first holographic means diffracts the S-polarized light component into said second holographic means; and
said second holographic means diffracts the S-polarized light diffracted by said first holographic means so that the S and P components of the incident light make an angle of greater than zero degrees with respect to each other upon exiting said second holographic means.

10. A holographic optical element according to claim 7, wherein said fringes in said first holographic means lie in a first group of parallel planes, said fringes in said second holographic means lie in a second group of parallel planes, and said first and second groups of parallel planes intersect at an angle less than approximately forty-five degrees.

11. A holographic optical element, comprising:
first holographic means containing a hologram comprising a plurality of fringes recorded with light of a first wavelength $\lambda_1$, said fringed having a tilt angle $\alpha_1$ with respect to a normal to said first holographic means during exposure and a tilt angle $\alpha_1'$ with respect to a normal to said first holographic means after development, for transmitting a first polarized light component of light without diffraction and diffracting, by a selected angle, a second polarized light component having a second wavelength $\lambda_2$ and making an incident angle $\theta_1$ with a normal to said first holographic means, the diffracted second polarized light component making a diffracted angle $\theta_2$ with a normal to said first holographic means, said hologram in said first holographic means being recorded with two beams making respective angles $\sigma_1$ and $\sigma_2$ with a normal to said first holographic means, where $2\alpha_1 = |(\theta_2 - \theta_2)/[s_1](\alpha_1'/\alpha_1)| = |\sigma_2 - \sigma_1|$ and $\lambda_2/(\sin\theta_1 + \sin\theta_2) = \lambda_1/(\sin\sigma_1 + \sin\sigma_2)$; and
second holographic means, containing a hologram comprising a plurality of fringes recorded with light of a first wavelength $\lambda_1$ and having a tilt angle $\alpha_2$ with a normal to said second holographic means during exposure and a tilt angle $\alpha_2'$ with respect to a normal to said second holographic means after development, for transmitting the first polarized light component without diffraction and diffracting the second polarized light component diffracted by said first holographic means and making an incident angle $\theta_3$ with a normal to said second holographic means by a selected angle, said hologram in said second holographic means being recorded with two beams making respective angles $\sigma_3$ and $\sigma_4$ with a normal to said second holographic means, where $2\alpha = |\theta_4 - \theta_3/[s_2](\alpha_2'/\alpha_2)| = |\sigma_4 - \sigma_3|$ and $\lambda_2/(\sin\theta_3 + \sin\theta_4) = \lambda_1/(\sin\theta_3 + \sin\theta_4)$ 12. A holographic optical element according to claim 11, wherein said first and second holographic means diffract the second polarized light component into a single beam.

13. A holographic optical element according to claim 11, wherein said fringes in said first holographic means lie in a first group of parallel planes, said fringes in said second holographic means lie in a second group of parallel planes, and said first and second groups of parallel planes intersect at an angle less than approximately forty-five degrees.

14. A holographic optical element according to claim 13, wherein:
   said first holographic means diffracts the S-polarized light component into said second holographic means; and
   said second holographic means diffracts the S-polarized light diffracted by said first holographic means so that the S and P components of the incident light make an angle of greater than zero degrees with respect to each other upon exiting said second holographic means.

15. A holographic optical element according to claim 11, wherein the first and second components of the incident light are P and S-polarized light, respectively.

16. A holographic optical element according to claim 11, wherein $\theta_2 = \theta_3$.

17. An optical head for interacting with an optical storage medium by directing a light beam at the optical storage medium and detecting the light beam reflected by the optical storage medium, comprising:
   source means for providing the light beam having a first wavelength $\lambda_1$ and a polarization in the P direction;
   converting means for converting the P-polarized light beam to a first type circularly polarized light beam and for converting a second type circularly polarized reflected light beam to an S-polarized reflected light beam; and
   a holographic optical element, comprising:
      first and second transparent substrates, and
      first and second holographic layers provided between said transparent substrates, each said holographic layer containing a hologram comprising a plurality of fringes recorded at a second wavelength $\lambda_2$ and having a tilt angle $\alpha$ with a normal to said holographic layer, each said holographic layer transmitting a first polarized light component of light having the first wavelength $\lambda_1$ and making an incident angle $\theta_1$ with a normal to said respective holographic layer without diffraction, said first holographic layer diffracting a second polarized light component of light having the first wavelength by a selected angle so that the second polarized light component diffracted by said first holographic layer makes a diffracted angle $\theta_2$ with a normal to said first holographic layer, said second holographic layer diffracting, by a selected angle, the second polarized light component diffracted by said first holographic layer and making an incident angle $\theta_1$ with a normal to said second holographic layer so that the second polarized light component makes a diffracted angle $\theta_2$ with a normal to said second holographic layer, each said hologram being recorded with two beams making respective angles $\sigma_1$ and $\sigma_2$ with a normal to said holographic layer, where $2\alpha = |\theta_2 - \theta_1| = |\sigma_2 - \sigma_1|$ and $\lambda_1/(\sin\theta_1 + \sin\theta_2) = \lambda_2/(\sin\sigma_1 + \sin\sigma_2)$.

18. An optical head according to claim 17, wherein the first and second components of the incident light are P and S-polarized light, respectively.

19. An optical head according to claim 18, wherein:
   said first holographic means diffracts the S-polarized light component into said second holographic means; and
   said second holographic means diffracts the S-polarized light diffracted by said first holographic means so that the S and P components of the incident light make an angle of greater than zero degrees with respect to each other upon exiting said second holographic means.

20. A holographic optical element according to claim 17, wherein said fringes in said first holographic means lie in a first group of parallel planes, said fringes in said second holographic means lie in a second group of parallel planes, and said first and second groups of parallel planes intersect at an angle less than approximately forty-five degrees.

21. A compact disk player, comprising:
   compact disk means for storing optical information;
   source means for providing an incident light beam having a first wavelength $\lambda_1$, the incident light beam being polarized in the P direction;
   collimating means for collimating the incident light beam;
   a quarter-wave plate for converting the P-polarized incident light beam to a first type circularly polarized incident light beam and for converting a second type circularly polarized light beam reflected by said compact disk means to a light beam polarized in the S direction;
   objective means for focussing the first type circularly polarized incident light beam on the surface of said compact disk means and for collimating the second type circularly polarized reflected light beam; and
   polarization-dependent beam splitter means, comprising:
      first and second transparent substrates, and
      first and second holographic layers provided between said transparent substrates, each said holographic layer containing a hologram comprising a plurality of fringes recorded at a second wavelength $\lambda_2$ and having a tilt angle with a normal to said holographic layer, each said holographic layer transmitting a first polarized light component of light having the first wavelength and making an incident angle $\theta_1$ with a normal to said respective holographic layer without diffraction, said first holographic layer diffracting a second polarized light component of light having the first wavelength by a selected angle so that the second polarized light component diffracted by said first holographic layer makes a diffracted angle $\theta_2$ with a normal to said first holographic layer, said second holographic layer diffracting, by a selected angle, the second polarized light component diffracted by said first holographic layer and making an incident angle $\theta_1$ with a normal to said second holographic layer so that the second polarized light component makes a diffracted angle $\theta_2$ with a normal to said second holographic layer, each said hologram being recorded with two beams making respective angles $\sigma_1$ and $\sigma_2$ with the normal to said holographic layer, where $2\alpha = |\theta_2 - \theta_1| = |\sigma_2 - \sigma_1|$ and $\lambda_1/(\sin\theta_1 + \sin\theta_2) = \lambda_2/(\sin\sigma_1 + \sin\sigma_2)$.

22. A compact disk player according to claim 21, wherein the first and second components of the incident light are P and S-polarized light, respectively.

23. A compact disk player according to claim 22, wherein:
   said first holographic means diffracts the S-polarized light component into said second holographic means; and
   said second holographic means diffracts the S-polarized light diffracted by said first holographic means so that the S and P components of the incident light make an angle of greater than zero degrees with respect to each other upon exiting said second holographic means.

24. A compact disk player according to claim 20, wherein said fringes in said first holographic means lie in a first group of parallel planes, said fringes in said second holographic means lie in a second group of parallel planes, and said first and second groups of parallel planes intersect at an angle less than approximately forty-five degrees.

25. A method of fabricating a holographic optical element having first and second holographic layers, each holographic layer containing a plurality of fringes recorded with light having a first wavelength $\lambda_1$ and making a tilt angle $\alpha$ with a normal to each holographic layer, the holographic optical element transmitting without diffraction a first component and diffracting by a selected angle a second component of light having a second wavelength $\lambda_2$, where the second component makes an incident angle $\theta_1$ with a normal to each holographic layer and the second component diffracted by each holographic layer makes a diffracted angle $\theta_2$ with a normal to each holographic layer, comprising the steps of:

(a) providing a prism having first, second and third sides;

(b) providing the first holographic layer on the first side of the prism;

(c) providing light having the first wavelength which is incident on the second side of the prism so that a first portion of the light is incident on the first holographic layer at an angle $\sigma_1$ to a normal to the first holographic layer and a second portion of the light is totally internally reflected by the third side of the prism and is incident upon the first holographic layer at an angle $\sigma_2$ to a normal to the first holographic layer, where $|\theta_2-\theta_1|=|\sigma_2-\sigma_1|=2\alpha$ and $\lambda_2/(\sin\theta_1+\sin\theta_2)=\lambda_1/(\sin\sigma_1+\sin\sigma_2)$; and (d) repeating said steps (b) and (c) for the second holographic layer.

26. A method according to claim 25, further comprising the step of (e) flipping the first hologram onto the second hologram.

27. A method according to claim 26, further comprising the step of (f) providing an optical adhesive between the first and second holograms.

28. A method according to claim 27, further comprising the step of (g) providing a first substrate on the first hologram and providing a second substrate on the second hologram.

29. A holographic beam splitter for separating the S and P portions of polarized incident light having a first wavelength, comprising:

a first transparent substrate;

first holographic means having a hologram recorded at a second wavelength provided on said first transparent substrate, for diffracting the S-polarized incident light by substantially 90 degrees with a diffraction efficiency of greater than approximately 90% and for transmitting the P-polarized incident light undiffracted;

second holographic means having a hologram recorded at the second wavelength provided on said first holographic means, for diffracting the S-polarized incident light diffracted by said first holographic means by a selected angle with a diffraction efficiency of greater than approximately 90% and for transmitting the P-polarized incident light undiffracted; and a second transparent substrate provided on said second holographic means.

30. A holographic beam splitter according to claim 29, wherein:

said first holographic means diffracts the S-polarized incident light into said second holographic means; and said second holographic means diffracts the S-polarized light into said second substrate.

31. A method of fabricating a holographic beam splitter for separating the S and P portions of polarized incident light having a first wavelength $\lambda_1$, comprising the steps of:

providing a first transparent substrate;

providing a first hologram recorded at a second wavelength $\lambda_2$ on the first transparent substrate, the first hologram diffracting the S-polarized incident light by substantially 90 degrees with a diffraction efficiency of greater than approximately 90% and transmitting the P-polarized incident light undiffracted;

providing a second hologram recorded at the second wavelength provided on the first hologram, the second hologram diffracting the S-polarized incident light diffracted by said first holographic means by a selected angle with a diffraction efficiency of greater than approximately 90% and transmitting the P-polarized incident light undiffracted; and providing a second transparent substrate on the second hologram.

32. A method according to claim 31, further comprising the steps of:

recording a plurality of fringed making an angle $\alpha$ with a normal to substrate containing the hologram to create each hologram with two beams making respective angles $\sigma_1$ and $\sigma_2$ with a normal to the substrate containing the hologram, where $2\alpha=|\theta_2-\theta_1|=|\sigma_2-\sigma_1|$, $\lambda_1/(\sin\sigma_1+\sin\theta_2)=\lambda_2/(\sin\sigma_1+\sin\sigma_2)$, and where $\theta_1$ and $\theta_2$ are the incident and diffracted angles of the S-polarized light. /$(\sin\theta_1+\sin\theta_2)$

* * * * *